United States Patent
Sephton et al.

[11] Patent Number: 5,847,391
[45] Date of Patent: Dec. 8, 1998

[54] REAL TIME RADIATION RESISTANT METER

[75] Inventors: John Peter Sephton, Teddington; Peter Harry Sharpe, Twickenham, both of United Kingdom

[73] Assignee: The Secretary of State for Trade and Industry in Her Britannic Majesty's Government of the United Kingdom of Great Britain and Northern Ireland, London, United Kingdom

[21] Appl. No.: 747,200

[22] Filed: Nov. 12, 1996

[30] Foreign Application Priority Data

Nov. 13, 1995 [GB] United Kingdom .................. 9523203

[51] Int. Cl.$^6$ ........................................................ G01T 1/00
[52] U.S. Cl. ...................................... 250/336.1; 250/252.1
[58] Field of Search ......................... 250/252.1 R, 336.1, 250/361 R, 370.01, 374, 389, 370.09, 307.07, 388

[56] References Cited

U.S. PATENT DOCUMENTS

| | | | |
|---|---|---|---|
| 3,073,954 | 1/1963 | Carlson et al. ........................ | 250/368 |
| 3,667,116 | 6/1972 | Di Felice ............................. | 250/492.1 |
| 4,090,083 | 5/1978 | Wyvill ................................ | 250/361 R |
| 4,092,539 | 5/1978 | Pao et al. ............................ | 250/336.1 |
| 4,495,413 | 1/1985 | Lerche et al. ......................... | 250/252.1 |
| 4,654,528 | 3/1987 | Cloud, Jr. et al. .................... | 250/336.1 |
| 4,742,227 | 5/1988 | Takenaka ............................. | 250/336.1 |
| 5,235,318 | 8/1993 | Schulcz . | |
| 5,440,135 | 8/1995 | Shonka ............................... | 250/374 |
| 5,514,873 | 5/1996 | Schulze-Ganzlin et al. ......... | 250/370.09 |

*Primary Examiner*—Edward J. Glick
*Assistant Examiner*—Darren M. Jiron
*Attorney, Agent, or Firm*—Thomas, Kayden, Horstemeyer & Risley, L.L.P.

[57] ABSTRACT

A radiation resistant meter for use in intense ionising radiation fields includes a meter unit (10) coupled to a separate processing and indicating unit (50) by means of a radio link (24,35). Radiation sensitive components in the voltage amplifier (14) and low frequency oscillator (16) are replaced by valves. Certain radiation sensitive components are covered in a potting compound. A calibration system formed from five zener voltage references (28) is located close to the sensor (12) and coupled to the same circuitry by a multiplexer (30), as is a thermistor (24) the signals from the components (12,26,28) are fed to the amplifier (14) in cyclical manner and processed by a computer (40) in the receiving unit (50). From the calibration voltages (28), the computer determines a calibration curve used for determining the magnitude of the parameter sensed by the sensor (12). The meter can operate at and measure radiation levels far higher than previously known equipment.

14 Claims, 2 Drawing Sheets

REAL TIME RADIATION RESISTANT METER

FOREIGN PRIORITY INFORMATION

Applicant hereby claims priority under 35 U.S.C. § 119 of British Application Ser. No. 9523203.9, filed Nov. 13, 1995.

FIELD OF THE INVENTION

The present invention relates to a real time radiation resistant meter.

BACKGROUND OF THE INVENTION

Meters for use in monitoring radiation or for use in radiation fields have been known for some time. Although known apparatus for these applications generally function adequately, problems arise when the radiation field is intense, for example in nuclear power plants or in sterilization plants. In intense radiation fields, the meter components are affected, leading to possible erroneous measurements. Moreover, problems arise with the degradation over time of the apparatus, which can only in part be resolved by shielding. The problems are such that known apparatus cannot withstand or operate satisfactorily in intense radiation fields.

Another problem occurs when the point or object to be monitored moves within a radiation field, for example on a conveyor belt. This is the case, for example, in sterilization plants. In order not to interfere with the movement of the point or object, systems have been developed which follow the movement and store the data collected for subsequent analysis.

SUMMARY OF THE INVENTION

The present invention seeks to provide a real time radiation resistant meter.

According to an aspect of the present invention, there is provided a real time radiation resistant meter for intense ionizing radiation fields comprising a meter unit resistant to intense radiation fields; an indicator unit operable to provide an indication of the parameter being monitored; and a wireless communication system coupling the meter and indicator units together.

This arrangement represents a departure from the prior art. It allows real time measurements to be taken and analysed and the determination of hot spots and other inconsistencies not previously possible with known equipment.

The communication link is preferably a radio link. In alternative embodiments, other links may be used, such as ultrasonic or infra-red.

Preferably, the meter unit is transistor based and includes at least one valve (vacuum tube) in place of a transistor. In the case where the meter unit includes sensing means coupled to an amplifier and an oscillator, the amplifier and/or oscillator may include at least one valve. Although the art has been moving in the direction of transistors and miniaturization, it has been found that much better performance can be obtained by replacing some or all the principal transistors with valves. It may not be necessary to replace all the transistors, only those most critically affected by the radiation.

In an embodiment, one or more of the components of the meter unit is covered in a potting compound. It has been found that potting compound can provide an effective shield to the effects of intense ionizing radiation.

The meter preferably includes calibration means operative to provide at regular intervals a reference calibration measurement, and processing means operative to determine a calibrated value of the output from the sensing means on the basis of the reference calibration measurement.

The calibration means may be operative to provide a reference calibration measurement before each reading of the output of the sensing means and may comprise a series of voltage references disposed close to the sensing means and coupled through substantially the same circuitry as the sensing means.

The voltage references are preferably provided by a series of zener diodes, which may be pre-irradiated. Other devices may also be used such as gas discharge tubes and batteries.

According to another aspect of the present invention, there is provided a radiation resistant meter for intense ionizing radiation fields comprising a transistor based meter unit including at least one valve.

According to another aspect of the present invention, there is provided a radiation resistant meter comprising a sensor for measuring the magnitude of a parameter, calibration means operative to provide at regular intervals a reference calibration measurement, and processing means operative to determine a calibrated value of the output from the sensor on the basis of the reference calibration measurement.

According to another aspect of the present invention, there is provided a radiation resistant meter for intense ionizing radiation fields comprising one or more radiation susceptible components covered in a potting compound.

An embodiment of the present invention is described below, by way of example only, with reference to the accompanying drawings, in which:

DETAILED DESCRIPTION OF THE FIGURES

Figure 1A:
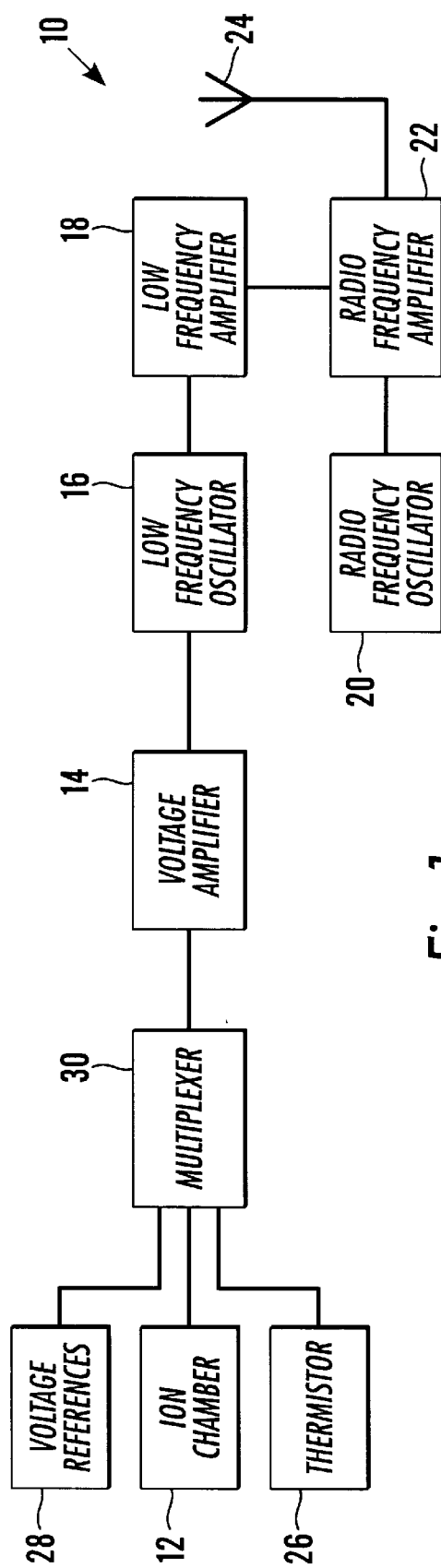
Figure 1B:
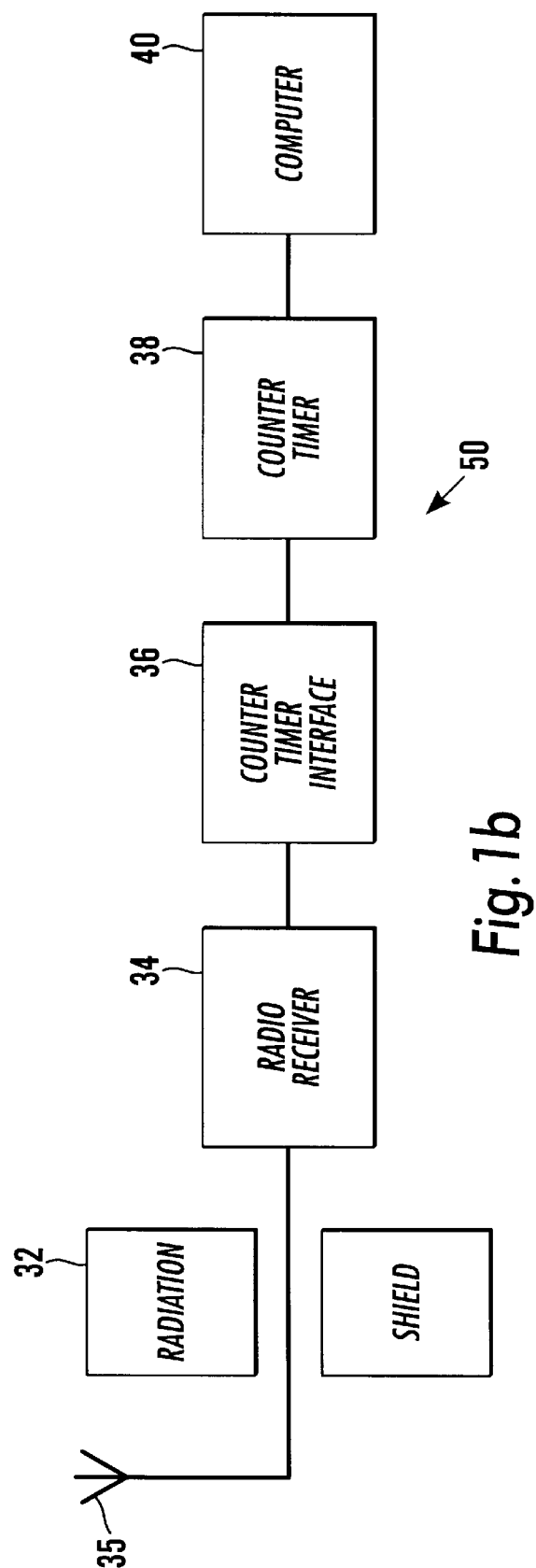
Figure 2:
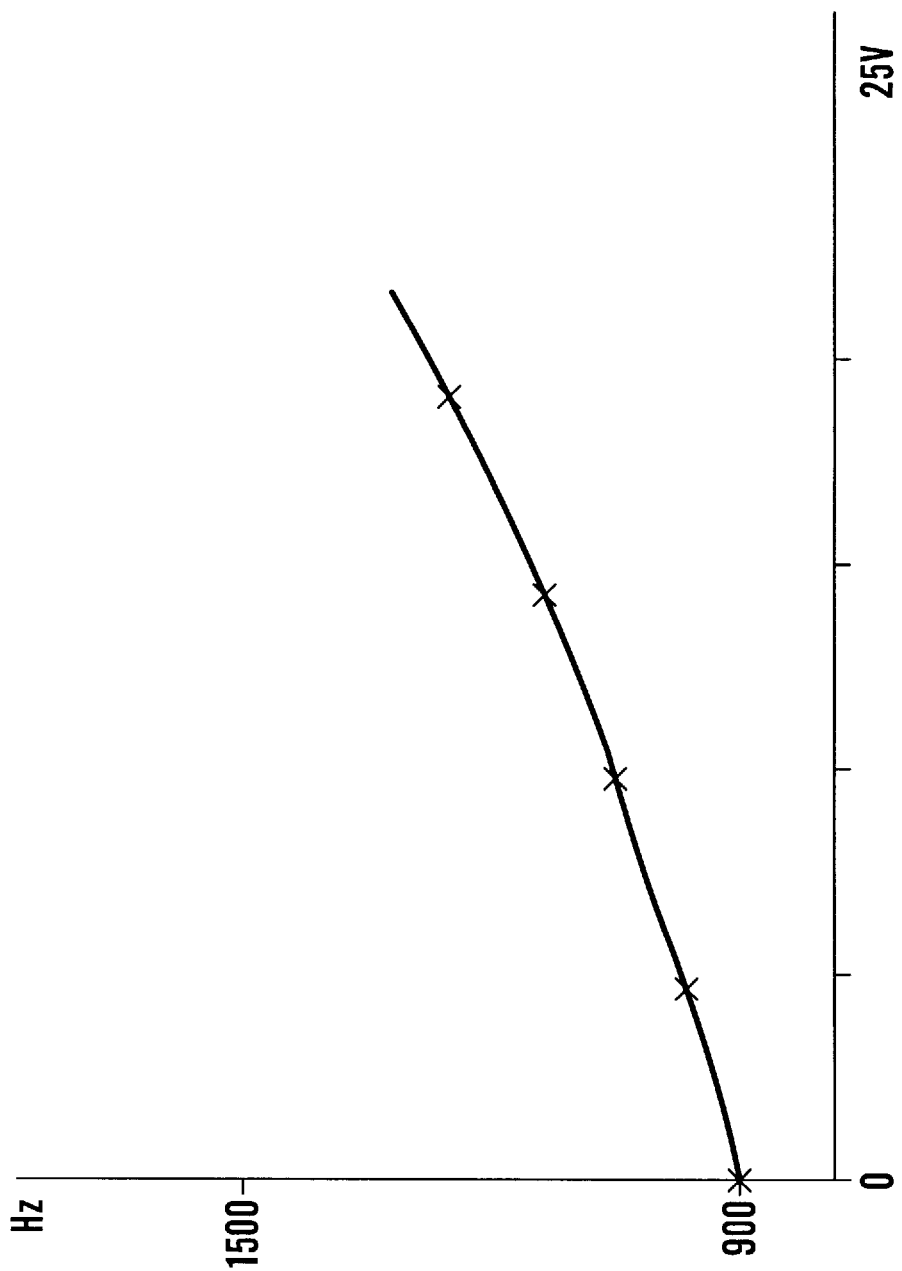

FIGS. 1a and 1b are block diagrams of a meter unit and of a processor and indicator unit of an embodiment of radiation resistant meter; and FIG. 2 is a graph of an example of calibration curve used in the meter of FIGS. 1a and 1b.

DETAILED DESCRIPTION OF THE PREFERRED EMBODIMENT

Referring to FIGS. 1a and 1b, an embodiment of radiation resistant meter is shown in block diagram form. The meter shown is designed for use in intense ionizing radiation fields of the type found, for example, in industrial radiation sterilization plants, nuclear power and decommissioning plants and nuclear research plants.

The meter shown is intended to be mobile, so as to be able to move within a plant, and to provide a real time indication of the parameter being measured. This embodiment is intended to measure radiation dose rate of high magnitudes and is provided with an ion chamber 12 for this purpose. The ion chamber 12 produces a current output which is proportional to the radiation dose rate.

A resistor (not shown) of large resistance is located at the ion chamber output to provide a voltage signal coupled to a voltage amplifier 14. The voltage amplifier 14 provides a suitable input to a low frequency oscillator 16, which is operative to generate an output having a frequency related to its input voltage, in conventional manner. The output of the oscillator 16 is coupled to a transmission unit formed of a low frequency amplifier 18, a radio frequency oscillator 20 and a radio frequency amplifier 22. An antenna 24 generates a radio wave.

As will be apparent to the skilled person, the voltage amplifier 14 and oscillator 16 are units which are sensitive to drift. The units 18–22, on the other hand, are relatively insensitive to drift.

During development of the meter unit 10, it was discovered that the oscillator 16 is radiation sensitive, giving a varying frequency with radiation intensity. The voltage amplifier 14 was also found to be radiation sensitive. This sensitivity was found to have an immediate effect on the performance of the units and to cause a long term performance change due to the eventual ageing of the components.

Prior art systems sought to deal with this sensitivity by stabilizing the transistor circuits. Although this works to a certain extent, it has been found that better resistance to radiation, and especially to drift, can be provided by replacing some or all of the principal transistors in the amplifier 14 and oscillator 16 with valves. It has also been found that other sensitive components of the units 14, 16, and the large resistor at the output of the ion chamber 12, can be shielded from the effects of radiation by means of a covering of potting compound. Heat-shrinkable sleeving has also been found to be similarly beneficial.

Tests have shown that valves subjected to intense ionizing radiation fields show no significant change in performance.

The potting of the voltage amplifier ground resistor has proved to be particularly important as a change in the effective value of the resistor whilst being irradiated cannot be detected.

Another advantage which has been discovered with valves is that different valves of the same type generally have similar radiation resistances. On the other hand, transistors of the same type have been found to have very different radiation resistances, thereby making them unsuitable as principal components in some applications.

Metal and polymer-based switches and the like can be replaced by equivalents formed from a combination of ceramic and metal or ceramic, metal and glass.

The meter unit 10 is powered by batteries (not shown), thereby making the unit easily movable.

It has been found that the combination of components and potting compound on sensitive components can enable the unit to be used in intense radiation fields. Experiments have shown the unit to survive in fields of 50 kGy per run and to have a total life dose of 5 MGy, far higher than prior art systems. Moreover, the unit can measure radiation dose rates which are many orders of magnitude greater than prior art systems. A prototype unit was able to measure up to 15 kGy per hour in a gamma radiation field with mean energy of up to 1.25 MeV.

The unit can measure temperature. In the preferred embodiment, the thermistor 26 is coupled in series with a large temperature stable resistor. Both resistors are preferably covered in a potting compound for increased resistance to the effects of radiation. The thermistor 26 is chosen so as to provide an accurate measure of temperature (preferably with an accuracy of ±0.5° C.).

A form of calibration is provided in place of conventional stabilization of the unit, which has been found to be unsuitable for this type of application. This calibration provides a set of known reference voltages 28 which are fed through the meter unit 10 along the same path as the output of the ion chamber 12. This calibration is used to replace stabilization of the circuits for drift and, it has been found, allows accurate measurements to be made.

The voltage references are provided by zener diodes (not shown) of predetermined voltage, which are arranged in series to give five voltage references spanning the output range of the ion chamber 12, or other sensor. It has been discovered in tests that the breakdown voltage of the zener diodes drifts with radiation dose. However, it has also been discovered that it is possible to pre-irradiate zener diodes to produce an irreversible change in voltage, which will then remain sufficiently stable within a certain range of radiation levels.

A multiplexer 30 is coupled to the voltage references 28, the ion chamber 12 and the thermistor 26 and feeds the signals therefrom sequentially through the circuitry 14–24, in a manner described in more detail below.

The processing and indicating part 50 of the meter, shown in FIG. 1b, is intended to be located outside the intense radiation field. A receiving antenna 35 is located within the radiation field and is connected to the receiving station via a cable passed through a radiation shield 32.

A radio receiver 34 of conventional form is coupled at its output to counter timer interface 36 and counter timer 38 which collectively provide a measure of the frequency of the low frequency oscillator 16. A computer 40 is coupled to receive the count rate from the counter timer 38 and to process therefrom the signals from the ion chamber 12, the thermistor 26 and the voltage references 28.

The operation of the unit will be described first with reference to the calibration process.

The multiplexer 30 is provided with relays (not shown) which switch the outputs from the ion chamber 12, the thermistor 26 and the voltage references 28 to the input of the voltage amplifier. This switching may occur at predetermined time intervals, for example every 60 seconds, or on the basis of a sequential switching cycle in which the outputs of the units 12, 26 and 28 are switched to the multiplexer in turn.

In the preferred embodiment the outputs are switched sequentially each time a measurement is to be taken. Thus, the meter unit 10 will emit signals relating to the ion chamber 12, the thermistor 26 and the voltage references 28 in cycles. The computer 40 is programmed to read these cyclical signals and to detect therefrom the five frequencies representative of the five voltage references from the unit 28. The reference voltages are measured prior to each run and remain sufficiently stable throughout the run for accurate calibration. They also provide a means of synchronization for the computer.

The five voltage references are used to form a calibration function, shown in FIG. 2. In the embodiment shown, the lowest voltage reference is intended to be ground and therefore provides a starting point for generation of the frequency to voltage curve of FIG. 2.

The computer 40 then senses the frequency corresponding to the ion chamber signal at the appropriate time in the cycle and determines from the calibration curve of FIG. 2 its output voltage and therefrom the radiation dose rate sensed.

In a similar manner, the computer 40 determines the thermistor temperature to inform the user of the temperature of the item under irradiation. It could also be used for calibration if required. Tests have shown that the preferred embodiment can be accurate to about 1% within the operating parameters described.

It will be apparent that the meter could sense any of a variety of parameters, for example pressure, position, fluid flow and the like. It is not necessary to have a radio link and other forms of wireless link may also be suitable. Preliminary tests have indicated that with the arrangement and choice of components described, it may be possible to replace one or more of the primary valves with a high gain high frequency transistor affecting the radiation resistance or the meter performance.

We claim:

1. A real time radiation resistant meter for measuring a parameter in an intense ionizing radiation field comprising a meter unit resistant to intense radiation fields of up to 15 KGy per hour; an indicator unit operable to provide an indication of the parameter being monitored; and a wireless communication system coupling the meter and indicator units together.

2. A meter according to claim 1, wherein the wireless communication system includes a radio link.

3. A real time radiation resistant meter for measuring a parameter in an intense ionizing radiation field comprising a meter unit resistant to intense radiation fields; an indicator unit operable to provide an indication of the parameter being monitored; a communication system coupling the meter and indicator units together, wherein the meter unit is transistor based and includes a plurality of transistors and at least one valve.

4. A meter according to claim 3, wherein the meter unit includes sensing means coupled to an amplifier and an oscillator, one of the amplifier and oscillator including the at least one valve.

5. A meter according to claim 3 or 4, wherein one or more components of the meter unit is covered in a potting compound.

6. A meter according to claim 4, comprising calibration means operative to provide at regular intervals a reference calibration measurement, and processing means operative to determine a calibration value of the output from the sensing means on the basis of the reference calibration measurement.

7. A meter according to claim 6, wherein the calibration means is operative to provide a reference calibration measurement in-between each reading of the output of the sensing means used to measure said parameter.

8. A meter according to claim 6 or 7, wherein the calibration means comprises a series of voltage references disposed close to the sensing means and coupled through circuitry corresponding to the sensing means.

9. A meter according to claim 8, wherein the voltage references are provided by a series of zener diodes.

10. A meter according to claim 9, wherein the zener diodes have been pre-irradiated.

11. A meter according claim 6, wherein the processing means is operative to generate a calibration function used in determining a calibrated sensor measurement.

12. The meter of claim 3, wherein said communication system is wireless.

13. A radiation resistant meter for measuring a parameter in an intense ionizing radiation field comprising a transistor based meter unit including a plurality of transistors and at least one valve.

14. A meter according to claim 13, including sensing means coupled to an amplifier, an oscillator and means for providing an indication to a user of the measured parameter; one of the amplifier and oscillator including the at least one valve.

* * * * *